United States Patent
Mehling et al.

(10) Patent No.: US 10,759,297 B2
(45) Date of Patent: Sep. 1, 2020

(54) CHARGING STATION HAVING DIFFERENTIAL CURRENT MONITORING FOR CHARGING AN ELECTRIC ENERGY STORAGE MEANS OF AN ELECTRIC VEHICLE

(71) Applicant: Bender Gmbh & Co. KG, Gruenberg (DE)

(72) Inventors: Frank Mehling, Ranstadt (DE); Sven Schaefer, Laubach (DE)

(73) Assignee: BENDER GMBH & CO. KG, Gruenberg (DE)

( * ) Notice: Subject to any disclaimer, the term of this patent is extended or adjusted under 35 U.S.C. 154(b) by 9 days.

(21) Appl. No.: 16/032,593

(22) Filed: Jul. 11, 2018

(65) Prior Publication Data

US 2019/0023143 A1 Jan. 24, 2019

(30) Foreign Application Priority Data

Jul. 18, 2017 (DE) .................. 10 2017 212 302

(51) Int. Cl.
*B60L 53/62* (2019.01)
*B60L 53/31* (2019.01)
*H02H 1/00* (2006.01)
*H02J 7/00* (2006.01)
*H02H 3/33* (2006.01)
(Continued)

(52) U.S. Cl.
CPC .............. *B60L 53/62* (2019.02); *B60L 53/31* (2019.02); *B60L 53/60* (2019.02); *H02H 1/0061* (2013.01); *H02H 3/332* (2013.01); *H02H 7/18* (2013.01); *H02J 7/0026* (2013.01); *H02J 7/0027* (2013.01); *H02J 7/0031* (2013.01); *H02J 7/045* (2013.01); *H02J 7/00034* (2020.01)

(58) Field of Classification Search
CPC ........ H02J 7/0026; H02J 7/0031; H02J 7/045; B60L 11/1838; B60L 53/10; B60L 53/62
USPC ........... 320/104, 109, 156, 158, 163; 361/42
See application file for complete search history.

(56) References Cited

U.S. PATENT DOCUMENTS

2012/0249070 A1 * 10/2012 Sellner ................... B60L 50/51
320/109
2012/0286729 A1 * 11/2012 Yegin ................... B60L 3/0069
320/109
(Continued)

FOREIGN PATENT DOCUMENTS

DE 102010028626 A1 11/2011
DE 102010045686 3/2012
(Continued)

*Primary Examiner* — Edward Tso
*Assistant Examiner* — Aaron Piggush
(74) *Attorney, Agent, or Firm* — King & Schickli, PLLC

(57) ABSTRACT

A charging station for charging an electric energy storage means of an electric vehicle using alternating charging current, having a fault-current protective device and having a charging controller. The fault-current protective device is divided into its functional units, a differential-current monitoring unit forming an integral structural unit in the form of a charging-current controller and monitoring device in conjunction with the charging controller according to the invention. Alternatively, the fault-current protective device forms an integral structural unit in the form of a charging-current controller and protective device in conjunction with charging controller.

8 Claims, 4 Drawing Sheets

Figure 1A:
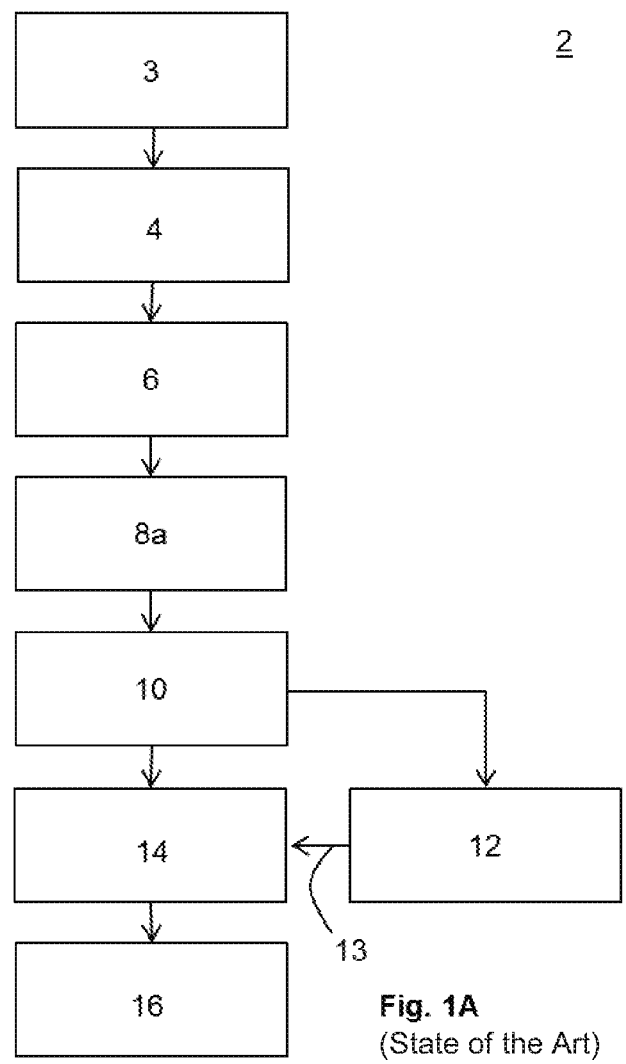

(51) Int. Cl.
*H02H 7/18* (2006.01)
*B60L 53/60* (2019.01)
*H02J 7/04* (2006.01)

(56) References Cited

U.S. PATENT DOCUMENTS

2014/0211345 A1* 7/2014 Thompson .............. B60L 53/68
361/42
2014/0254050 A1* 9/2014 Haines ............... G01R 31/3277
361/42

FOREIGN PATENT DOCUMENTS

| | | |
|---|---|---|
| DE | 102012022455 A1 | 5/2014 |
| DE | 102015225856 A1 | 6/2017 |
| EP | 2963752 A2 | 1/2016 |
| GB | 2474244 A | 4/2011 |
| JP | H05243203 A | 12/1994 |
| WO | WO2014122647 A1 | 8/2014 |

* cited by examiner (State of the Art)

(State of the Art)

CHARGING STATION HAVING DIFFERENTIAL CURRENT MONITORING FOR CHARGING AN ELECTRIC ENERGY STORAGE MEANS OF AN ELECTRIC VEHICLE

This application incorporates by reference the disclosure of German Patent Application no. 10 2017 212 302.8, filed Jul. 18, 2017.

TECHNICAL FIELD

The invention relates to a charging station for charging an electric energy storage means of an electric vehicle using alternating charging current, having a fault-current protective device and having a charging controller.

It is commonly known that for operating an electric vehicle or a hybrid vehicle, the electric energy storage means of the electric vehicle has to be regularly charged at a charging station. For this purpose, a time-efficient charging current regulation adjusted to the operational data of the energy storage means of the electric vehicle is indispensable.

The invention at hand presumes a charging procedure using an alternating charging current, with a corresponding charging controller being arranged in the charging station. Thus, a charging current regulation in the electric vehicle is not necessary, which in turn saves costs and reduces the weight of the electric vehicle.

BACKGROUND

In regard of electrical safety, safety-related precautions must be taken during the charging procedure in order to preclude any risk to the person handling the device and to prevent any material damage. As a result of the electrical connection between the electric vehicle and the charging station, a comprehensive grounded system having alternating and direct voltage/DC components arises from the hitherto ungrounded vehicle power supply of the electric vehicle in connection with a stationary grounded power supply system. Besides an insulation monitoring, a reliably functioning fault-current protective device is therefore of importance. In the following, a fault-current protective device is under-stood to be a generic fault-current protective device having the functions (functional elements): detecting a fault current as a differential current; and evaluating the fault current by monitoring the differential current and having a switching function. Specific structural embodiments (structural designs) of the fault-current protective device are referred to as a type A RCD (residual current device) fault-current protective device according to standard IEC 61008-1//DIN EN 61008-1 (VDE 0664-10) or as a type B RCD fault-current protective device according to standard IEC 62423//DIN EN 62423 (VDE 0664-40).

From the state of the art, the possibility of monitoring the system, which consists of a charging station and a vehicle, via a type A RCD fault-current protective device arranged in the charging station is known, as described in DE 10 2010 028 626 A1, for example. This type A RCD fault-current protective device is capable of detecting alternating fault currents and pulse fault direct currents.

Should the charging station of the electric vehicle be provided with a power outlet or a vehicle coupling according to the series of standards IEC 62196//DIN EN 62196 (VDE 0623), a type B (RCD) fault-current protective device or a type A (RCD) fault-current protective device must be used in conjunction with a suitable device for switching off the supply in the event of faulty direct currents >6 mA according to standards IEC 61851-1 as well as IEC 60364-7-722 (VDE 0100-722) in order to further detect pure fault direct currents (DC fault currents).

The proposed charging stations, which are known from the state of the art and consist of a plurality of electrical component groups having partially redundant functions and requiring extensive wiring and correspondingly large installation spaces, have proven to be disadvantageous as they increase the costs for the production and installation of the charging station.

SUMMARY

The object of the invention at hand is therefore to design a charging station for charging an electric energy storage means of an electric vehicle, which excels via a compact, cost- and time-efficient design.

This object is attained in conjunction with the preamble of claim 1, by the fault-current protective device consisting of a separately arranged measuring current transformer, a differential-current monitoring unit and a separately arranged switching element, said differential-current monitoring unit forming an integral structural unit in the form of a charging-current controller and monitoring device in conjunction with the charging controller.

The fundamental idea of this embodiment is based on the fault-current protective device being carried out modularly. For this purpose, the modular fault-current protective device is first divided into the separated functional units (functional elements, cf. above) measuring current transformer, differential-current monitoring unit, and switching element and thus corresponds to a modular fault current device MRCD (modular residual current device) according to IEC 60947-2 Annex M//DIN EN 60947-2 Annex M (VDE 0660-101).

The separate measuring current transformer (sum current transformer) detects a fault current, which occurs in active conductors of a connection line to the electric vehicle, as differential current. The measuring signal emitted by the separate measuring current transformer is supplied to the differential-current monitoring unit and evaluated. Should the measured differential current surmount a triggering threshold, a fault current consequently is identified, the differential-current monitoring unit controlling the externally arranged (with respect to the charging-current controller and monitoring device) switching element, which separates the connection line to the electric vehicle, by means of the triggering threshold.

Via the modular design of the fault-current protective device, it is now possible to integrate the differential-current monitoring unit and the charging controller in a structural unit according to the invention. Thereby, a charging-current controller and monitoring device consisting of the charging controller and the differential-current monitoring unit is realized. In conjunction with a separately arranged switching element, the type A or type B RCD fault-current protective device can be omitted in this embodiment with respect to the state of the art and thus the costs and required installation space can be reduced.

In another embodiment, the separate measuring current transformer and the differential-current monitoring unit are all-current sensitive.

In conjunction with a suitable measuring current transformer, the all-current-sensitive (type B) embodiment of the differential-current monitoring unit enables also detecting and identifying pure fault direct currents besides detecting and identifying alternating fault currents and pulse fault direct currents.

Advantageously, the separately arranged switching element is a load contactor or a load relay.

In the event of a fault current identified by the differential-current monitoring unit or when terminating the charging procedure via the charging controller, a triggering signal is generated in the charging-current controller and monitoring device and controls the load contactor or the load relay, consequently causing the connection line to the electric vehicle to be separated and thus interrupting the charging procedure.

Furthermore, a data communication channel can be installed between the charging-current controller and monitoring device and the electric vehicle connected to the charging station.

Via the data communication channel, data are transmitted for controlling a charging current adjusted to the energy storage means of the electric vehicle, such as electric data of the energy storage means and data for the electrical safety, such as the present insulation resistance of the electric vehicle for setting a suitable differential-current triggering threshold.

The object of the invention is alternatively attained in conjunction with the preamble of claim 5, by the fault-current protective device forming an integral structural unit in the form of a charging-current controller and protective device in conjunction with the charging controller, said charging-current controller and protective device comprising an internal measuring current transformer, a differential-current monitoring unit and an internal switching element besides the charging controller.

In this alternative embodiment, the functional elements of a fault-current protective device are integrated in a structural unit in conjunction with the charging controller. Through this, a charging-current controller and protective device consisting of the charging controller and the fault-current protective device is created, the entire function of a fault-current protective device, namely the differential current detection by means of an internal measuring current transformer, the differential-current monitoring unit as well as the (internal) switching element, also being integrated in the charging-current controller and protective device besides the charging-current controller.

A type A or type B RCD fault-current protective device is omitted in this alternative embodiment as well with respect to the state of the art in order to cut down on costs.

Furthermore, the internal measuring current transformer and the differential-current monitoring unit are all-current sensitive.

Thus, the charging-current controller and protective device comprise all functions of a type B RCD fault-current protective device so that the detection and identification of pure fault direct currents is also enabled besides the detection and identification of alternating fault currents and pulse fault direct currents.

Advantageously, the internal switching element is a load relay which is controlled by means of a triggering signal in the event of fault current identified by the differential-current monitoring unit or when determining that the charging procedure was terminated by the charging controller and causes the connection line to the electric vehicle to be separated.

Furthermore, a data communication channel can be installed between the charging-current controller and protective device and the electric vehicle connected to the charging station.

Analogously to the first described embodiment, data for controlling a charging current adjusted to the energy storage means of the electric vehicle and data concerning the electrical safety are transmitted via the data communication channel.

BRIEF DESCRIPTION OF THE DRAWING FIGURES

Figure 2:
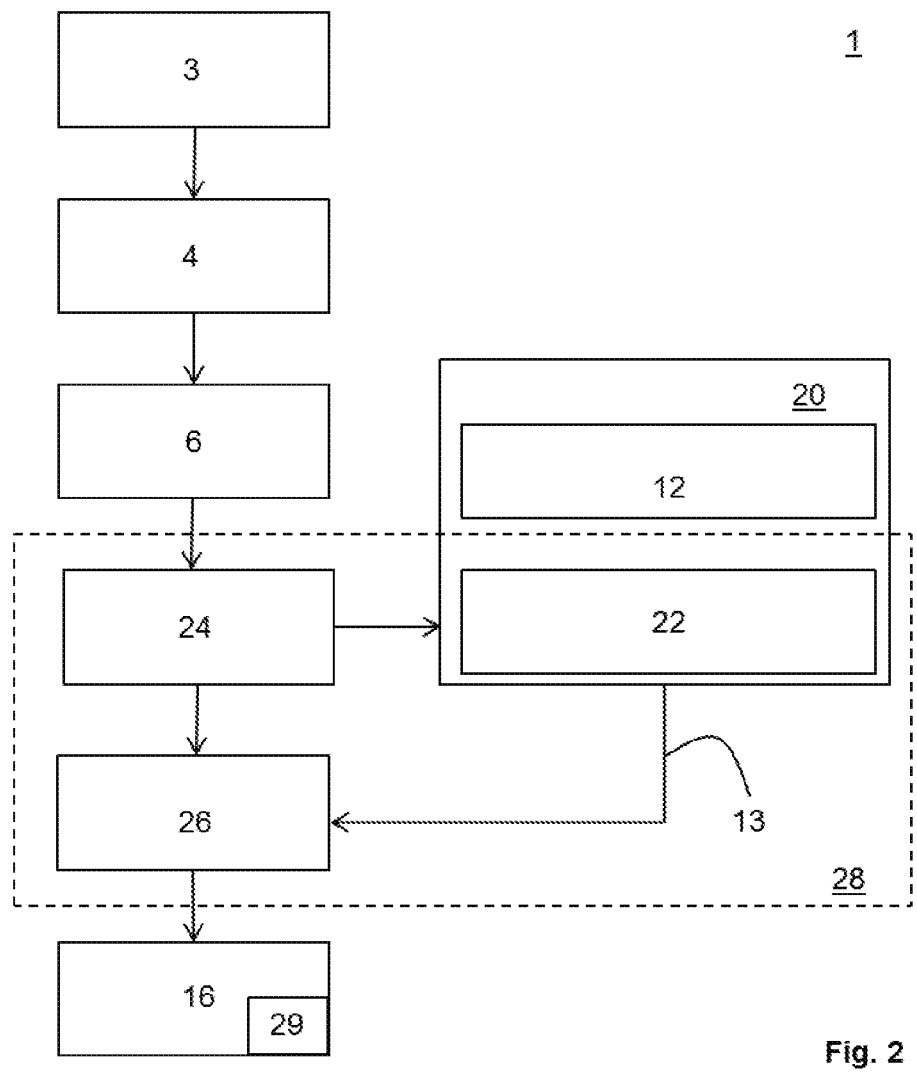
Figure 3:
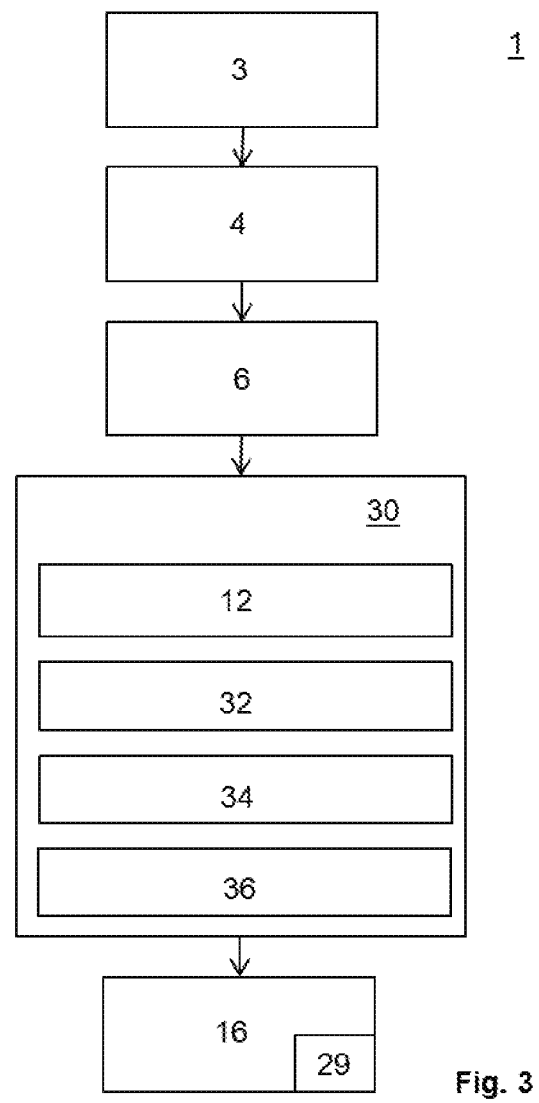

Further advantageous embodiments can be derived from the following description and the drawings which illustrate a preferred embodiment of the invention by means of examples. In the following, FIGS. 1A and 1B illustrate a functional block diagram of embodiments of a charging station according to the state of the art, FIG. 2 illustrates a functional block diagram of a charging station according to the invention and FIG. 3 illustrates a functional block diagram of an alternative embodiment of a charging station according to the invention.

DETAILED DESCRIPTION

Figure 1B:
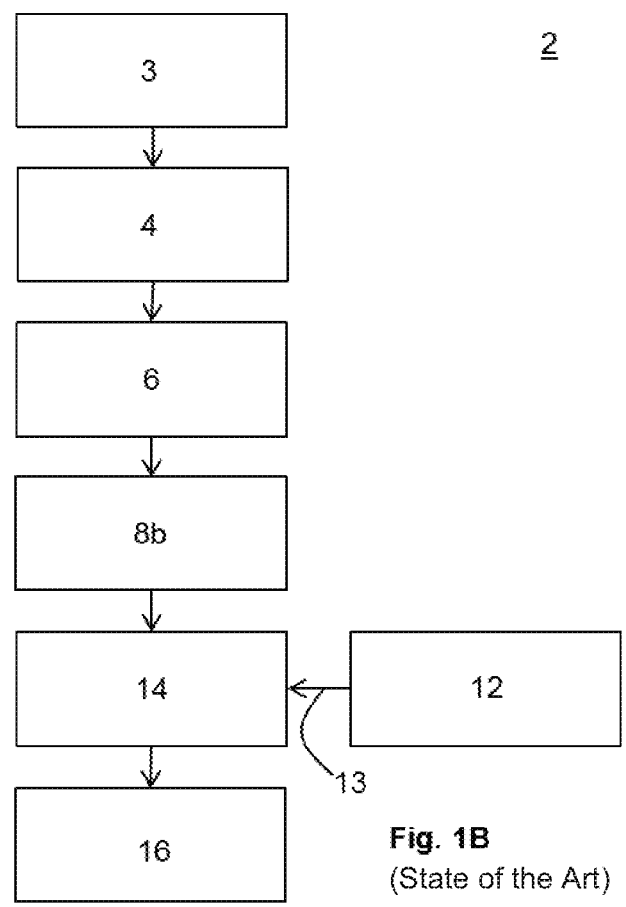

FIGS. 1A and 1B each illustrate the design of a charging station 2 for electric vehicles according to the state of the art.

Starting from a stationary power supply system, the charging station 2 comprises an electric supply 3 which is protected by a pre-fuse 4. The charging station 2 has an energy level meter 6 and a type A RCD fault-current protective device 8a (FIG. 1A) or a type B RCD fault-current protective device 8b (FIG. 1B).

In the instance of the charging station 2 according to FIG. 1A, the charging station 2 comprises, besides the first measuring current transformer arranged in the type A RCD fault-current protective device 8a, a second measuring current transformer 10 for detecting a fault direct current.

The charging controller 12 acts on a switching element 14 which separates a connection line to a vehicle connection 16 when a fault direct current occurs or when the charging procedure is terminated.

In the instance of the charging station 2 according to FIG. 1B, the charging station 2 comprises a type B RCD fault-current protective device 8b which is capable of detecting fault direct currents, pulse fault direct currents and (pure) fault direct currents, and undertakes a disconnection should a fault occur.

The charging controller 12 acts on the switching element 14 via a triggering signal 14 when the charging procedure is terminated in order to separate the connection line to the vehicle connection 16.

In FIG. 2, a functional block diagram of a charging station 1 according to invention is illustrated.

The charging station 1 comprises the following functional elements known from the state of the art: energy supply 3, back-up fuse 4 and energy level meter 6.

Furthermore according to the invention, the charging station 1 comprises a charging-current controller and monitoring device 20 in which the charging controller 12 and a differential-current monitoring unit 22 are integrated so as to form a structural unit.

A separate measuring current transformer 24 and a separate switching element 26 realized as a load contactor or a load relay are arranged outside of the charging-current controller and monitoring device 20.

The separate measuring current transformer 24, the differential-current monitoring unit 22 arranged in the charging-current controller and monitoring device 20, and the separate switching element 26 can be seen as functional elements of a standardized MRCD fault protection device 28.

Preferably, the separate measuring current transformer 24 and the differential-current monitoring unit 22 are all-current sensitive.

The charging-current controller and monitoring device 20 controls the separate switching element 26 via a trigger signal 13 in order to separate the connection line to the vehicle connection 16 when a fault arises (inadmissibly high differential current) or when the charging procedure has been terminated.

The vehicle connection 16 can comprise a data communication channel 29 for exchanging data from data with the electric vehicle, which are specific to the energy storage means or safety-related.

FIG. 3 illustrates a functional block diagram of an alternative embodiment of a charging station 1 according to the invention.

This alternative embodiment differs from the embodiment in FIG. 2 in that it comprises a charging-current controller and protective device 30 in which the charging controller 12, an internal measuring current transformer 32, a differential-current monitoring device 34 and an internal switching element 36 are integrated in order to separate the vehicle connection line to a structural unit.

By omitting a separate type A or type B RCD fault-current protective device in both embodiments according to FIGS. 2 and 3, a second switching element is not required. This omission leads to a reduction of the number of required components, reduces the need for extensive wiring and thus leads to a reduction in costs when producing the charging station. Simultaneously, the required installation space is also reduced, whereby the charging station can be designed in a compact manner.

The invention claimed is:

1. A charging station (1) for charging an electric energy storage means of an electric vehicle using an alternating charging current, having a fault-current protective device which is carried out modularly with functional elements of a generic standardized modular residual current device (MRCD) and having a charging controller (12), characterized in that the fault-current protective device consists of a separately arranged measuring current transformer (24), a differential-current monitoring unit (22) and a separately arranged switching element (26), said differential-current monitoring unit (22) forming an integral structural unit in the form of a charging-current controller and monitoring device (20) in conjunction with the charge controller (12).

2. The charging station (1) according to claim 1, characterized in that the separate measuring current transformer (24) and the differential-current monitoring unit (22) are all-current sensitive.

3. The charging station (1) according to claim 1, characterized in that the separately arranged switching element (26) is a load contactor or a load relay.

4. The charging station (1) according to claim 1, characterized in that a data communication channel (29) is installed between the charging-current controller and monitoring device (20) and the electric vehicle connected to the charging station (1).

5. A charging station (1) for charging an electric energy storage means of an electric vehicle using alternating charging current, having a fault-current protective device which is carried out modularly with functional elements of a generic standardized modular residual current device (MRCD) and having a charging controller (12), characterized in that the fault-current protective device forms an integral structural unit in the form of a charging-current controller and protective device (30) in conjunction with the charging controller (12), said charging-current controller and protective device (30) comprising an internal measuring current transformer (32), a differential-current monitoring unit (34) and an internal switching element (36) besides the charging controller (12).

6. The charging station (1) according to claim 5, characterized in that the internal measuring current transformer (32) and the differential-current monitoring unit (34) are all-current sensitive.

7. The charging station (1) according to claim 5, characterized in that the internal switching element (36) is a load relay.

8. The charging station (1) according to claim 5, characterized in that a data communication channel (29) is installed between the charging-current controller and protective device (30) and the electric vehicle connected to the charging station (1).

* * * * *